(12) United States Patent
Lu

(10) Patent No.: US 6,424,107 B1
(45) Date of Patent: Jul. 23, 2002

(54) APPARATUS AND METHOD FOR CONTROLLING AN ELECTRIC MOTOR

(75) Inventor: Engelbert Lu, Ann Arbor, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/656,204

(22) Filed: Sep. 6, 2000

(51) Int. Cl.[7] .................................................. H02P 7/00
(52) U.S. Cl. ....................... 318/432; 318/805; 388/806; 388/821; 388/823; 388/833
(58) Field of Search ................................. 318/432, 798, 318/801, 802, 805; 388/806, 821, 823, 833

(56) References Cited

U.S. PATENT DOCUMENTS

| | | | |
|---|---|---|---|
| 4,427,934 A | 1/1984 | Tupper | 318/723 |
| 4,611,158 A | 9/1986 | Nagase et al. | 318/803 |
| 4,868,477 A | 9/1989 | Anderson et al. | 318/696 |
| 4,980,623 A | 12/1990 | Anton | 318/632 |
| 5,223,775 A | 6/1993 | Mongeau | 318/432 |
| 5,350,989 A | 9/1994 | Wedeen | 318/632 |
| 5,442,268 A | 8/1995 | Goodarzi et al. | 318/432 |
| 5,444,341 A * | 8/1995 | Kneifel, II et al. | 318/432 |
| 5,569,989 A * | 10/1996 | Acquaviva | 318/254 |
| 5,616,999 A | 4/1997 | Matsumura et al. | 318/632 |
| 5,668,721 A * | 9/1997 | Chandy | 701/41 |
| 5,734,249 A | 3/1998 | Pohjalainent et al. | 318/798 |
| 5,743,351 A * | 4/1998 | McLaughlin | 180/446 |
| 5,780,989 A * | 7/1998 | Matsumoto | 318/632 |
| 5,821,714 A | 10/1998 | Williams | 318/439 |
| 5,821,725 A | 10/1998 | Wang et al. | 318/799 |
| 6,008,599 A | 12/1999 | Beck | 318/254 |
| 6,107,767 A * | 8/2000 | Lu et al. | 318/561 |
| 6,242,874 B1 * | 6/2001 | Kalpathi et al. | 318/254 |

* cited by examiner

*Primary Examiner*—Robert E. Nappi
*Assistant Examiner*—Rina I. Duda
(74) *Attorney, Agent, or Firm*—Tarolli, Sundheim, Covell, Tummino & Szabo L.L.P.

(57) ABSTRACT

An apparatus (10) for controlling an electric motor (36) having a plurality of motor phases includes a motor controller (32) that controls energization of each phase of the plurality of motor phases. A compensation circuit (56, 84, 104) is associated with each phase of the plurality of motor phases. The compensation circuit (56, 84) of one phase of the plurality of motor phases adjusts a control parameter of another phase of the plurality of motor phases an amount functionally related to an electrical characteristic of the one phase in response to determining a diminished operating characteristic of the one phase.

21 Claims, 3 Drawing Sheets

APPARATUS AND METHOD FOR CONTROLLING AN ELECTRIC MOTOR

TECHNICAL FIELD

The present invention relates to controlling an electric motor. In particular, the present invention relates to an apparatus and method for controlling an electric motor so as to reduce torque ripple.

BACKGROUND OF THE INVENTION

There are many known types of power assist steering systems for automotive vehicles. Some systems provide steering assist by using hydraulic power, some by using electric power, and others by a combination of hydraulic and electric power.

An electric assist steering system includes an electric motor drivingly connected to steerable vehicle wheels. When energized, the electric motor assists the steering movement of the steerable wheels. The electric assist motor is controlled in response to steering torque applied to the steering wheel.

A typical control arrangement for an electric motor includes a motor controller that provides a current command signal for energizing the electric motor. A current sensor senses the electric current in the electric motor and provides a signal indicative of the sensed current. An error signal is derived from the current command signal and the sensed current signal. A voltage command signal is then determined based on the error signal. The voltage command signal is provided to a switching circuit, which typically includes a pulse width modulation inverter. The pulse width modulation inverter, in turn, drives the electric motor in response to the determined voltage command signal.

Examples of motor control arrangements for reducing torque ripple are disclosed in U.S. Pat. Nos. 4,611,158, 5,223,775, 5,350,989, 5,616,999, 5,821,714, and 5,821,725.

SUMMARY OF THE INVENTION

One aspect of the present invention provides an apparatus for controlling an electric motor having a plurality of motor phases. The apparatus includes a motor controller that controls energization of each phase of the plurality of motor phases. A compensation circuit is associated with each phase of the plurality of motor phases. The compensation circuit of one phase of the plurality of motor phases adjusts a control parameter of another phase of the plurality of motor phases an amount functionally related to an electrical characteristic of the one phase in response to determining a diminished operating characteristic of the one phase.

Another aspect of the present invention provides an apparatus for controlling an electric motor that includes an electric motor having a plurality of motor phases. A motor controller provides a current command signal for controlling energization of each phase. A current sensor senses electric current of each respective phase of the electric motor. The system also includes a plurality of current controllers, each of which controls energization of an associated phase based on the current command signal for the associated phase and the sensed electric current of the associated phase. A compensation circuit of the associated phase provides a compensation signal for adjusting the current command signal of another phase in response to determining a diminished operating characteristic of the associated phase.

Another aspect of the present invention provides a method for controlling operation of an electric motor having a plurality of motor phases. The method includes the steps of providing a command signal for controlling energization of each of the plurality of motor phases and determining a diminished operating characteristic for an energized phase of the plurality of motor phases. A control parameter of another phase is adjusted an amount functionally related to an electric characteristic of the energized phase of the plurality of motor phases in response to determining the diminished operating characteristic.

BRIEF DESCRIPTION OF THE DRAWINGS

The foregoing and other features and advantages of the invention will become more apparent to one skilled in the art upon consideration of the following description of the invention and the accompanying drawings, in which.

DESCRIPTION OF AN EXEMPLARY EMBODIMENT

Figure 1:
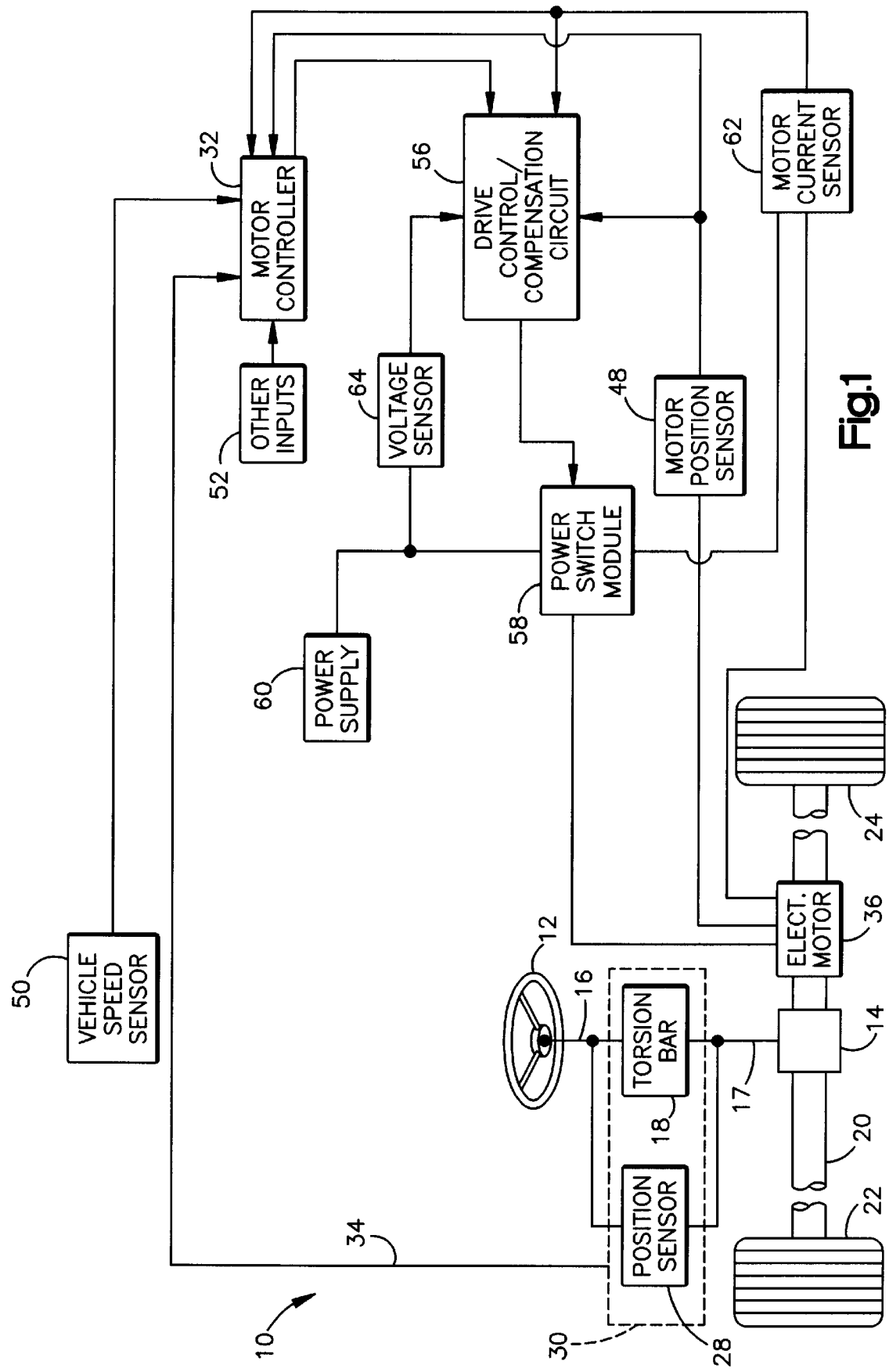
FIG. 1 is a schematic block diagram of an electric steering system in accordance with the present invention.

FIG. 1 illustrates an electric steering system 10 that includes a steering wheel 12 operatively connected to a pinion gear 14. In particular, the vehicle steering wheel 12 is connected to an input shaft 16 and the pinion gear 14 is connected to a pinion shaft 17. The input shaft 16 is operatively coupled to the pinion shaft 17 through a torsion bar 18. The torsion bar 18 twists in response to steering torque applied to the steering wheel 12. This permits relative rotation between the input shaft 16 and the pinion shaft 17. The amount of relative rotation between shafts 16 and 17 is functionally related to the torsion bar spring constant and the amount of applied steering torque. Stops (not shown) may be used to limit the amount of such relative rotation between the input shaft 16 and the pinion shaft 17 in a manner known in the art.

By way of example, the pinion gear 14 has helical teeth which meshingly engage straight cut teeth located on a rack or linear steering member 20. The pinion gear 14 in combination with the straight cut gear teeth on the rack member 20 form a rack and pinion gear set. The rack member 20 is steerably coupled to the vehicle's steerable wheels 22 and 24 with steering linkages. When the steering wheel 12 is turned, the rack and pinion gear set converts the rotary motion of the steering wheel into linear motion of the rack member 20. When the rack member 20 moves linearly, the steerable wheels 22 and 24 pivot about their associated steering axes and the vehicle is steered.

A shaft position sensor 28 is operatively connected across the input shaft 16 and the pinion shaft 17. The position sensor 28 provides a signal having an electrical characteristic indicative of the relative rotational position between the input shaft 16 and the pinion shaft 17. The position sensor 28 in combination with the torsion bar 18 form a torque sensor 30. Other types of torque sensors also could be used.

An output of the torque sensor 30 is connected to a motor controller 32 for providing a torque signal 34. The torque signal 34 indicates the steering torque applied to the vehicle steering wheel 12 by a vehicle operator. The controller 32 processes the torque signal 34 and determines a torque command value and a direction value based on the torque signal.

The torque command and direction values may be determined by the controller 32 in any one of many methods known in the art. For example, the torque command and direction values are determined in accordance with the process described in U.S. Pat. No. 5,257,828 to Miller et al.

The torque command and direction values represent the amount (e.g., magnitude) and direction of torque to be generated by an associated electric assist motor 36. The electric assist motor 36 is drivingly connected to the rack member 20, such as through a ball-nut drive arrangement. An example of a ball-nut drive arrangement that may be used in the system 10 is disclosed in U.S. Pat. No. 4,415,054, now U.S. Reissue Pat. No. 32,222.

When the motor 36 is energized, it provides steering assist to aid in the rotation of the steerable wheels 22 and 24. The electric assist motor 36, for example, is a variable reluctance motor. Other types of electric motors also could be used, such as a permanent magnet AC motor or a DC permanent magnet motor.

Figure 2:
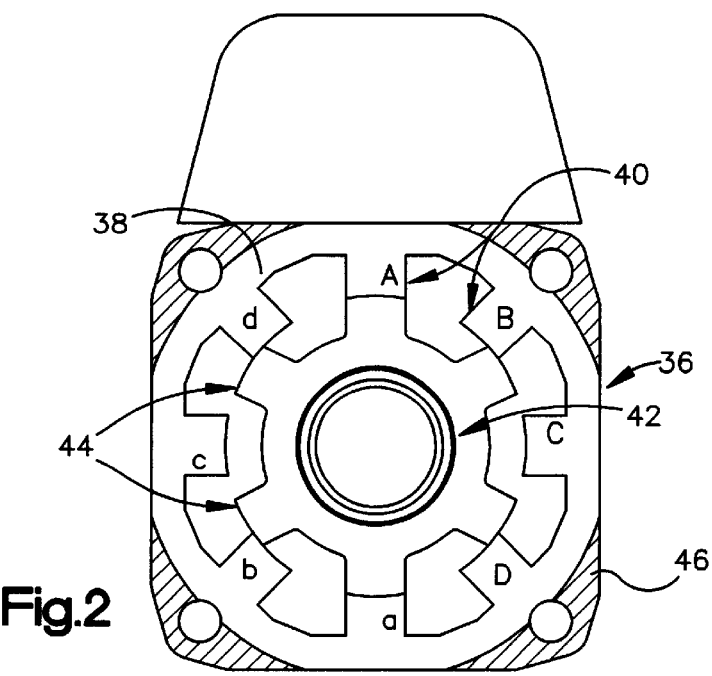
FIG. 2 is a cross-sectional view of the electric assist motor shown in FIG. 1.

FIG. 2 illustrates the electric motor 36 as a variable reluctance motor, in accordance with an exemplary embodiment of the present invention. The motor 36 includes a stator 38 with eight stator poles 40 and a rotor 42 with six rotor poles 44. Each stator pole 40 has an associated stator coil (not shown). The stator poles 40 are arranged so as to be energized in pairs designated Aa, Bb, Cc, and Dd. This results in four stator pole pairs and six rotor poles 44. The motor 36 is mounted in a motor housing 46 so that the stator 38 is fixed relative to the housing 46.

The principle of operation for a variable reluctance motor is well known in the art. Basically, the stator poles are energized in pairs. Specifically, electric current is provided to the stator coils associated with a given pair of stator poles. The rotor moves so as to minimize the reluctance between the energized stator poles and the rotor poles. Minimum reluctance occurs when a pair of rotor poles are aligned with the energized stator poles. Once minimum reluctance is achieved, i.e., when a rotor pole pair is aligned with an energized stator pole pair, the energized stator poles are deenergized and a next adjacent pair of stator poles are energized. The direction of motor rotation is controlled by controlling the sequence in which the stator poles are energized. The torque produced by the motor is controlled by controlling the amount of current through the energized stator coils.

Referring between FIGS. 1 and 2, in order for the motor controller 32 to control operation of the variable reluctance motor 36, including the direction of motor rotation and motor torque, it is necessary to know the position of the rotor 42 relative to the stator 38.

The system 10, therefore, includes a motor position sensor 48. The position sensor 48 is operatively connected to the electric motor 36, between the motor rotor 42 and either the motor stator 38 or housing 46. The stator 38 and the motor housing 46 are relatively stationary, such as being mounted at a fixed location to the vehicle. The position sensor 48 functions to provide an electrical signal indicative of the position of the rotor 42 relative to the stator 38. An arrangement for sensing rotor position in a four phase variable reluctance motor is disclosed in the above-identified U.S. Pat. No. 5,257,828 to Miller et al.

The system 10 includes a vehicle speed sensor 50 connected to the motor controller 32. The vehicle speed sensor 50 provides a signal to the controller 32 indicative of sensed vehicle speed. This enables the controller 32 to provide speed proportional steering.

Other inputs 52 also are connected to the motor controller 32. These other inputs 52 include, for example, an ECU temperature sensor, soft-start circuitry, a power switch temperature sensor, etc. Examples of such other sensors are more fully described in the above-referenced U.S. Pat. No. 5,257,828 to Miller et al. The other inputs 52 provide corresponding signals to the controller 32 indicative of the respective conditions sensed thereby.

The motor controller 32 is also connected to a drive control/compensation circuit 56 for providing a current command reference signal. In particular, the controller 32 provides a reference current command signal to the drive control/compensation circuit 56 for controlling energization of each phase of the electric motor 36. While, for purposes of explanation the drive control/compensation circuit 56 is illustrated as being separate from the motor controller 32, the functions performed by the motor controller and the drive control/compensation circuit 56 could be implemented in a single circuit or controller. For example, such circuitry may include discrete circuits, analog circuitry, a combination of discrete and analog circuitry, an application-specific integrated circuit, or any combination thereof.

The drive control/compensation circuit 56 is connected to a power switch module 58. The power switch module 58 is operatively connected between a power supply 60, such as the vehicle battery, and the electric assist motor 36. The power switch module 58, for example, is formed of an array of switching devices, such as field effect transistors (FETs). The switching devices are pulse-width-modulated in a known manner in response to the control signal from the drive control/compensation circuit 56. The particular manner in which the switching devices are pulse-width-modulated controls the direction and level at which the stator pole pairs Aa, Bb, Cc and Dd (FIG. 2) are energized. This, in turn, controls the level of steering assist provided by the electric motor 36.

The system 10 also includes a motor current sensor 62 circuit for sensing the electric current through each phase of the electric motor 36. The current sensor, for example, includes current sense resistors (e.g., shunt resistors) connected to the electric assist motor 36 and to the power switch module 58. The motor current sensor 62 also is connected to the motor controller 32 and to the drive control/compensation circuit 56 for providing a signal having an electrical characteristic indicative of the sensed current through each phase of the motor 36. An example of a current sensing arrangement, which may be used in the system 10, is disclosed in U.S. Pat. No. 6,008,599 to Beck.

A voltage sensor 64 is connected to the power supply 60 for providing a signal to the drive control/compensation circuit 56 indicative of the sensed voltage level of the power supply 60.

As mentioned above, the motor controller 32 provides current reference signals to the drive control/compensation circuit 56. The reference signals are determined as a function of the torque signal 34 and the signals from the vehicle speed sensor 50, the other inputs 52, the motor position sensor 48, and the motor current sensor 62. The drive control/compensation circuit 56 provides a voltage command signal to the power switch module 52 which, in turn, controls the level of electric current (i.e., energization) of the stator pole pairs.

In addition to providing a command voltage signal for controlling the energization of each phase of the electric motor 36, the drive control/compensation circuit 56 also helps reduce torque ripple in the electric motor. The reduction in torque ripple is a result of the drive control/compensation circuit 56 detecting and compensating for diminished electrical characteristics or capabilities of the electric motor. In particular, the drive control/compensation circuit 56 compensates for a diminished operating characteristic associated with one phase by adjusting an electric operating parameter (e.g., current or voltage) of another phase by a determined amount.

The drive control/compensation circuit 56 determines the occurrence of a diminished operating characteristic of an energized motor phase based on the sensed electric current characteristic and/or the command voltage for such motor phase. In this regard, the drive control/compensation circuit 56 is configured to compare the determined voltage command of each phase with the sensed battery voltage from the voltage sensor 64. If the command voltage for a phase exceeds the sensed available battery voltage, a diminished voltage characteristic exists for such phase. A diminished current characteristic for an energized phase also is determined when the difference between the sensed current of the energized phase and the reference current command for such phase exceeds a predetermined limit error value. The difference between the sensed current and the associated reference current command signal is referred to as a current error.

When a diminished operating characteristics is determined for one phase of the electric assist motor 36, such as based on either of the approaches stated above, the drive control/compensation circuit 56, in accordance with the present invention, adjusts an electric characteristic of another phase of the electric motor 36. The compensation of the another phase includes, for example, adjusting the current command reference signal from the motor controller for such other phase by adding a current command compensation signal. Preferably, the current command compensation signal is functionally related to the sensed current and/or the current command reference signal of the phase in which the diminished operating characteristic is detected.

A diminished operating characteristic may be detected by monitoring the voltage and current characteristics of the electric motor. The command voltage for each phase (e.g., $V_{cmd\_a}$ for phase A of the motor 36) varies depending upon the operating condition of the electric motor 36. Under normal operating conditions the phase voltage of the electric motor should equal the command voltage through control of the switching devices of the power switch module 58. It is known, for example, that the command voltage for a phase (e.g., phase A) may be represented as:

$$V_{cmda} = L_a \frac{di_a}{dt} + i_{sense\_a} R_a + \omega \frac{d\lambda_a}{d\theta_a} \qquad \text{Eq. 1}$$

where:

$L_a$ = inductance of phase A;

$\frac{di_a}{dt}$ = change in phase current with respect to time;

$i_{sense\_a}$ = current sensed through phase A

R = internal resistance of phase A;

$\omega$ = angular velocity of motor;

$\frac{d\lambda_a}{d\theta_a}$ = change in flux linkage with respect to motor position.

At high motor speeds and at corresponding motor positions, the actual phase voltage has certain limitations relative to the command voltage $V_{cmd\_a}$. For example, the term omega $$\omega \frac{d\lambda_a}{d\theta_a}$$

corresponds to the back EMF of the electric motor. The back EMF of the electric motor, thus, varies as a function of angular velocity and motor position. The current through the resistor and the back EMF also may provide losses since the inductance $L_a$ and the change in phase current $$\frac{di_a}{dt}$$

also vary as a function of motor position. Consequently, under certain operating conditions of the motor, the terms in Eq. 1 have values that provide voltage losses exhibited in the actual motor voltage when compared to the desired command voltage (E.g., $V_{cmd\_a}$).

When such voltage losses are relatively high, an increased command voltage $V_{cmd\_a}$ is required to achieve a desired torque level. However, the $V_{cmd\_a}$ is limited by the available energy from the power supply 60 (e.g., $V_{battery}$). In situations when $V_{cmd\_a} > V_{battery}$, there is an increased torque ripple due to, for example, the internal resistance and back EMF of phase A expressed in Eq. 1.

Figure 3:
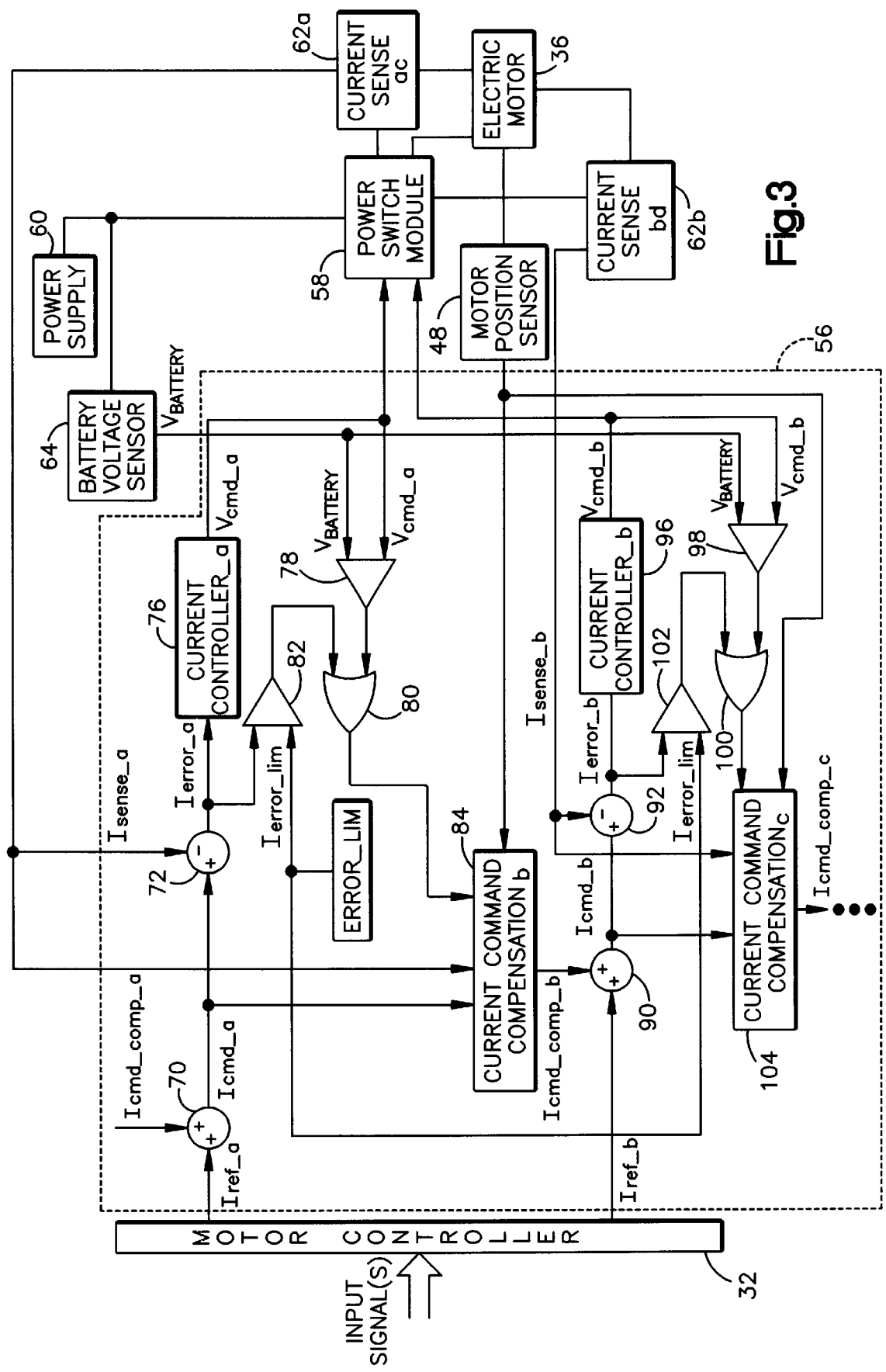
FIG. 3 is a functional block diagram illustrating part of the system of FIG. 1 in greater detail.

FIG. 3 is a functional representation of part of the system 10 of FIG. 1 in which identical reference numbers are used to designate corresponding parts previously identified with respect to FIG. 1. The items contained within the drive control/compensation circuit block 56 illustrate operations performed within the drive control/compensation circuit. In a microcomputer embodiment of the present invention, such functions would be performed by software stored in memory of the microcomputer. The function of the drive control/compensation circuit 56 could be implemented as hardware and/or software.

Referring to FIG. 3, the motor controller 32 provides current command reference signals $I_{ref\_a}$ and $I_{refb}$ for controlling the direction and level of energization for phases A and B, respectively, of the electric motor 36. While, for purposes of brevity, functional elements are illustrated within the drive control/compensation circuit 56 for only two phases A and B, the present invention contemplates use with an electric motor 36 having more than two phases, as indicated by the ellipsis. The operation of the drive control/compensation circuit 56 will now be described with respect to phases A and B.

The motor controller 32 provides the current reference signal $I_{ref\_a}$ to an input of a summing function 70. A current command compensation signal $I_{cmd\_comp\_a}$ is provided to another input of the summing function 70. The current command compensation signal $I_{cmd\_comp\_a}$ is provided by a compensation function (not shown) associated with another phase of the electric motor 36.

The summing function 70 adds these signals together to provide the current command signal $I_{cmd\_a}$. The current command signal $I_{cmd\_a}$ is provided to a positive input of another summing function 72. An associated current sensor 62a provides a signal indicative of the current sensed through phase A, indicated at $I_{sense\_a}$, to a negative input of the summing function 72. In this exemplary embodiment, the current sensor 62a is configured to sense electric current in phases A and C, although a separate current sensors could be used for each phase. Alternatively, a single current sensor may be used to sense electric current in all phases of electric motor 36. The summing function 72 provides a current tracking error, indicated at $I_{error\_a}$, for phase A. The current tracking error $I_{error\_a}$ is difference between $I_{cmd\_a}$ and $I_{sense\_a}$ (e.g., $I_{error\_a}=I_{cmd\_a}-I_{sense\_a}$) The current tracking error $I_{error\_a}$ is provided to a current controller 76 for phase A.

The current controller 76 determines a voltage command value for energizing phase A as a function of the current tracking error $I_{error\_a}$. The current controller 76 provides a signal corresponding to the determined voltage command value, designated as $V_{cmd\_a}$. The voltage command signal is provided to the power switch module 58 for controlling the direction and level to which phase A is energized. Under normal operating conditions, phase A, as well as each other phase, is controlled based on such parameters. When the drive control/compensation circuit detects a diminished operating characteristic of an energized phase, such as phase A, a current command compensation signal $I_{cmd\_comp\_b}$ is provided to another phase, such as phase B.

Specifically, the output signal $V_{battery}$ of the voltage sensor 64 is provided to an input of a comparator function 78. The voltage command signal $V_{cmd\_a}$ is provided to another input of the comparator function 78. The comparator function 78 provides a logic output signal (e.g., TRUE or FALSE) indicating whether $V_{cmd\_a}$ exceeds the available battery voltage Vbattery sensed by the voltage sensor 64. When $V_{cmd\_a}$ is greater than the available battery voltage $V_{battery}$, the comparator function 78 provides a logic TRUE output signal to an input of an OR function 80. The logic TRUE output signal from the OR function 80 indicates a diminished voltage capability for phase A.

The current tracking error $I_{error\_a}$ is provided to an input of another comparator function 82. A current error limit reference value $I_{error\_lim}$ is provided to another input of the comparator function 82. The reference value $I_{error\_lim}$ is stored in memory and corresponds to a preset limit for the current tracking error. The value of $I_{error\_lim}$ is selected to indicate a condition when the current command signal is not being tracked well. The comparator function 82 compares $I_{error\_lim}$ and $I_{error\_a}$ to provide a logic output signal (e.g., TRUE or FALSE) to another input of the OR function 80. The logic output signal from the comparator function 82 indicates whether the current tracking error exceeds the error limit value provided by the error limit function. When the current tracking error $I_{error\_a}$ exceeds the error limit value $I_{error\_lim}$, the comparator function 82 provides a logic TRUE output signal. When this occurs, the electric motor 36 operates sluggishly due to, for example, diminished responsiveness of the current controller 76 to the current command signal $I_{cmd\_a}$. The sluggish operation of the electric motor 36 also may occur in response to a diminished responsiveness of the power switch module 58 to voltage command signal $V_{cmd\_a}$ and/or in response to the motor itself not properly energizing.

The OR function 80 provides a corresponding logic output signal to a current command compensation function 84. The current command compensation function 84 is operative to adjust the current command signal of another phase of the electric motor 36. In this example, the current command compensation function 84 provides a current command compensation signal $I_{cmd\_comp\_b}$ for adjusting the reference current command signal $I_{ref\_b}$ of phase B.

As mentioned above, the current command compensation signal $I_{cmd\_comp\_b}$ is functionally related to $i_{cmd\_a}$, $I_{sens\_a}$. Accordingly, the current command signal $I_{cmd\_a}$ and the sensed current signal $I_{sense\_a}$ are provided to the current command compensation function 84. Specifically, the current command compensation signal may be represented as:

$$I_{cmd\_comp\_b} = (I_{sense\_a} - I_{cmd\_a})\left(\frac{\frac{\partial T_a}{\partial i_a}}{\frac{\partial T_b}{\partial i_b}}\right) \qquad \text{Eq. 2}$$

where:

$\partial T_a/\partial i_a$=Torque gain of phase A
$\partial T_a/\partial i_a$=Torque gain of phase B Each torque gain term varies as a function of motor position and the electric current through the respective phase. The torque gain term corresponds to the sensitivity of the phase, i.e., how the torque changes proportional to changes in electric current in each respective phase.

By way of example, the torque gain values for each phase of the motor are provided by a look-up table stored in memory of the drive control/compensation circuit 56. Because, the torque gain values vary as a function of motor position and the current through the associated phase, the motor position sensor 48 also provides the motor position signal to the current command compensation function 84. The torque gain values may be determined for each motor phase through empirical testing for the particular motor being used. The determined values are stored in the look-up table and selected as a function of the sensed motor position and the sensed current through the associated motor phase. Alternatively, a value for this term may be calculated using a predetermined equation based on the sensed electric current and motor position.

Accordingly, the current command compensation function 84 compensates the reference current $I_{ref\_b}$ by the amount $I_{cmd\_comp\_b}$ (Eq. 2) in response to determining the occurrence of a diminished operating characteristic for phase A (i.e., the OR function 80 provides a logic TRUE output signal). In the event that no diminished operating characteristic of phase A is determined (i.e., the OR function provides a logic FALSE output signal to the current command compensation function), then $$I_{cmd\_comp\_b}=0. \qquad \text{Eq. 3}$$

That is, when no diminished operating characteristic of phase A is determined, the compensation function 84 does not adjust any electrical characteristic of phase B. The OR function 80, thus, either enables or disables the compensation function 84 according to whether a diminished operating characteristic is determined.

With particular reference to phase B, the motor controller 32 provides a reference current command signal $I_{ref\_b}$ to an input of a summing function 90. The current command compensation function 84 associated with phase A provides the compensation signal $I_{cmd\_comp\_b}$ to another input of the summing function 90. The summing function 90 adds these signals together to provide the current command signal $I_{cmd\_b}$. The current command signal $I_{cmd\_b}$ is provided to a positive input of another summing function 92. An associated current sensor 62b provides a signal indicative of the current sensed through phase B, indicated at $I_{sense\_b}$, to a negative input of the summing function 92. The summing function provides a current tracking error for phase B, indicated at $I_{error\_b}$ (e.g., $I_{error\_b}=I_{cmd\_b}-I_{sense\_b}$). The summing function provides the current tracking error $I_{error\_b}$ to a current controller 96 for phase B. The current controller 96 determines a command voltage for phase B as a function of the current tracking error $I_{error\_b}$ and provides a voltage command signal designated $V_{cmd\_b}$ to the power switch module 58. $V_{cmd\_b}$ controls the direction and level at which phase B is energized, as described above.

When the drive control/compensation circuit 56 detects a diminished operating characteristic for phase B, a current command compensation signal $I_{cmd\_comp\_c}$ is provided to another phase, namely, phase C. Specifically, the voltage sensor provides the sensed battery voltage signal $V_{battery}$ to an input of a comparator function 98. The voltage command signal $V_{cmd\_b}$ is provided to another input of the comparator function 98. The comparator function 98 provides a logic output signal (e.g., TRUE or FALSE) indicating whether $V_{cmd\_b}$ exceeds the available battery voltage $V_{battery}$. When $V_{cmd\_b}$ is greater than the available battery voltage $V_{battery}$, the comparator function 98 provides a logic TRUE output signal to an input of an OR function 100. This indicates that a diminished voltage capability exists for phase B, which often results in unwanted torque ripple.

The current tracking error $I_{error\_b}$ is provided to an input of another comparator function 102. The current error limit reference value $I_{error\_lim}$ is provided to another input of the comparator function 102. The comparator function 102 compares the $I_{error\_lim}$ and the $I_{error\_b}$ and provides a logic output signal (e.g., TRUE or FALSE) to another input of the OR function 100 based on such comparison. The logic output from the comparator function 102 indicates whether the current tracking error $I_{error\_b}$ exceeds the error limit value $I_{error\_lim}$ provided by the error limit function. When the current tracking error $I_{error\_b}$ exceeds the error limit value $I_{error\_lim}$, the comparator function 102 provides a logic TRUE output signal to the OR function 100. Under such circumstances, the electric motor 36 operates sluggishly due diminished responsiveness by the current controller of phase B. This usually results in undesired torque ripple. The logic output signal from the OR function indicates whether a diminished operating characteristic exists for phase B.

The OR function 100 provides a corresponding logic output signal to control operation of an associated current command compensation function 104. The current compensation function 104 is operative to adjust an electrical parameter of another phase of the electric motor 36 based on the output signal from the OR function 100, i.e., as provided by Eqs. 2 and 3. In this example, the current command compensation function 104 provides a current command compensation signal $I_{cmd\_comp\_c}$ for adjusting the reference current command of phase C.

Similar algorithms are associated with each phase of the multi-phase electric motor 36. In this way, a compensation function associated with one phase adjusts an electrical characteristic (e.g., voltage or current) of another phase in response determining the occurrence of diminished operating characteristic for the one phase. The compensation function implemented by this control arrangement helps to reduce torque ripple of the electric motor 36.

Figure 4:
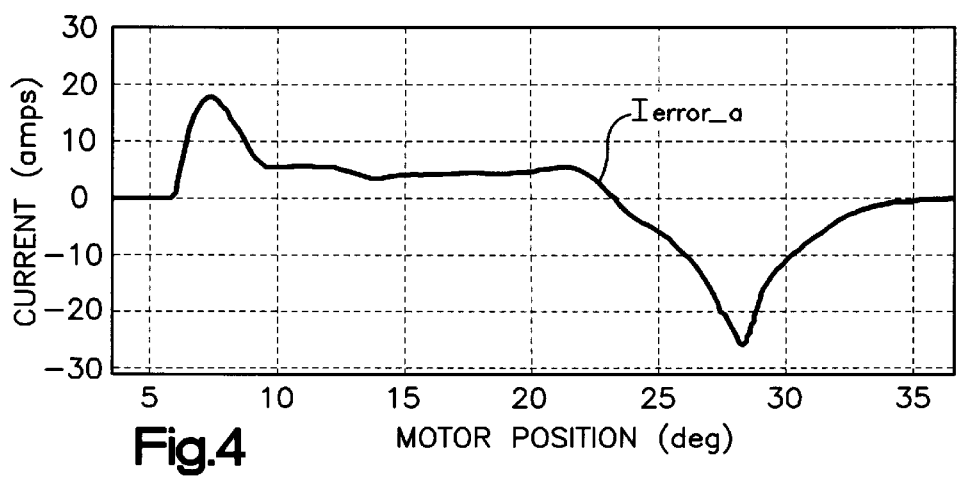
FIG. 4 is a graphical representation of motor current as a function of motor position.

FIG. 4 illustrates the current tracking error $I_{error\_a}$ as a function of motor position. The current tracking error $I_{error\_a}$ significantly decreases at about 25 mechanical degrees. This position corresponds to the occurrence of a diminished operating characteristic associated with, for example, phase A.

Figure 5:
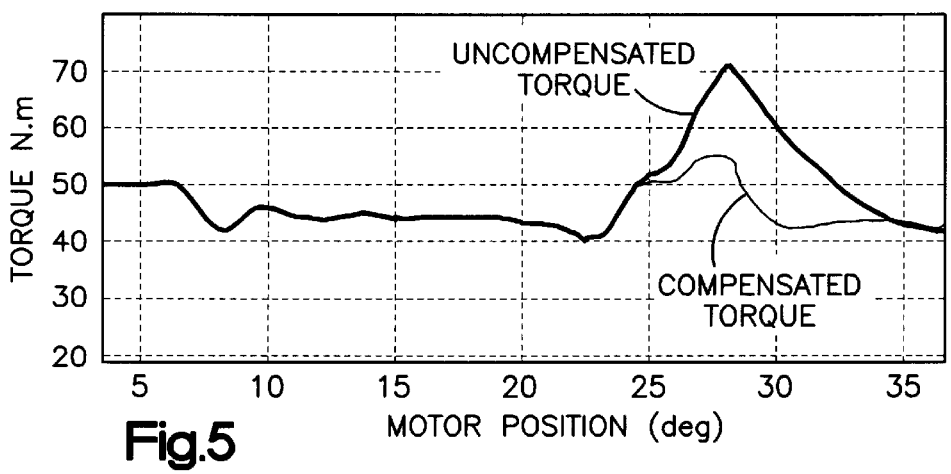
FIG. 5 is a graphical representation of motor torque versus motor position.

FIG. 5 illustrates uncompensated torque versus motor position for a situation when the electric motor 36 has a diminished operating characteristic, i.e., $V_{cmd}>V_{battery}$ and/or $I_{error}>I_{error\_lim}$. There is substantial torque ripple when uncompensated. Also shown in FIG. 5 is a representation of the torque versus motor position for an electric motor controlled using the compensation technique described above. Advantageously, the torque ripple is significantly decreased. The decrease in torque ripple results from the compensation function of each phase experiencing a diminished operating characteristic adjusting the electric current command in another phase, such as an adjacent phase.

From the above description of the invention, those skilled in the art will perceive improvements, changes and modifications. While an exemplary control arrangement has been described with respect to an electric steering system, the present invention is equally applicable to other types of systems and to electric motors in general. Such improvements, changes and modifications within the skill of the art are intended to be covered by the appended claims.

Having described the invention, the following is claimed:

1. An apparatus for controlling an electric motor having a plurality of motor phases, said apparatus comprising:
   a motor controller which controls energization of each phase of the plurality of phases; and
   a compensation circuit associated with each phase of the plurality of motor phases, said compensation circuit of one phase of the plurality of motor phases adjusting a control parameter of another phase of the plurality of motor phases an amount functionally related to an electric characteristic of the one phase in response determining a diminished operating characteristic of the one phase.

2. An apparatus as set forth in claim 1 further including a current controller associated with each phase of said plurality of motor phases, the current controller of the one phase determining a command voltage for energizing the one phase, said compensation circuit of the one phase being operative to adjust the control parameter of the another phase in response to determining that the command voltage of the one phase exceeds an available voltage level.

3. An apparatus as set forth in claim 1 wherein said motor controller provides a current command signal for controlling energization of each phase of said plurality of phases, said apparatus further includes a current sensor for sensing electric current of the one phase and providing a current sensor signal indicative thereof, the diminished operating characteristic of the one phase being determined in response to the difference between the current sensor signal and the current command signal for the one phase having a predetermined relationship relative to a reference error value.

4. An apparatus as set forth in claim 3 wherein the compensation circuit of the one phase adjusts the control parameter of the another phase by an amount functionally related to the sensed current of the one phase of the plurality of motor phases.

5. An apparatus as set forth in claim 4 wherein the adjusted control parameter of the another phase controls the electric current of the another phase.

6. An apparatus as set forth in claim 1 wherein said motor controller provides a current command signal for energizing each phase of the plurality of phases, said compensation circuit of the one phase providing a current compensation signal which adjusts the current command signal of the another phase in response to determining the diminished operating characteristic for the one phase.

7. An apparatus as set forth in claim 6 wherein the compensation circuit of the one phase includes a current controller that provides a voltage command signal for energizing the one phase based on the current command signal of the one phase, the diminished operating characteristic of the one phase being determined in response to the voltage command signal of the one phase having a predetermined relationship relative to voltage available from a source of electrical energy.

8. An apparatus as set forth in claim 6 wherein the diminished operating characteristic of the one phase is determined in response to the difference between a sensed electric current of the one phase and the current command signal of the one phase having a predetermined relationship relative to a reference error value.

9. An apparatus as set forth in claim 8 wherein the current compensation signal for the another phase has a value functionally related to the current command signal for the one phase and the sensed electric current of the one phase.

10. An apparatus as set forth in claim 6 wherein the current compensation signal for the another phase is determined by:

$$I_{comp}=(I_{sense1}-I_{cmd1})*(\partial T_1/\partial i_1)/(\partial T_2/\partial i_2)$$

where $I_{sense1}$=a sensed current in the one phase (amperes);

$I_{cmd1}$=the current command signal for the one phase (amperes);

$\partial T_1/\partial i_1$=torque gain of the one phase (Nm/ampere);

$\partial T_2/\partial i_2$=torque gain of the another phase (Nm/ampere); and $I_{comp}$=the current compensation signal (amperes).

11. An apparatus for controlling an electric motor comprising:
   an electric motor having a plurality of motor phases;
   a motor controller that provides a current command signal for controlling energization of each phase of said plurality of motor phases;
   a current sensor for sensing electric current of each respective phase;
   a plurality of current controllers, each of said current controllers controlling energization of an associated one of said phases based on the current command signal for said associated one phase and the sensed electric current of said associated one phase; and
   a compensation circuit associated with said associated one phase that provides a compensation signal for adjusting the current command signal of another of said phases in response to determining a diminished operating characteristic of said associated one phase.

12. An apparatus as set forth in claim 11 wherein said compensation circuit of said associated one phase is operative to adjust the current command signal of said another phase by an amount functionally related to at least one of the current command signal and a sensed electric current of said associated one phase.

13. An apparatus as set forth in claim 12 wherein each of said current controllers provides a command voltage for each associated phase of said plurality of motor phases, said compensation circuit of said associated one phase being operative to adjust the current command signal of said another phase in response to the command voltage of said associated one phase exceeding an available voltage level.

14. An apparatus as set forth in claim 12 wherein said compensation circuit of said associated one phase further includes means for determining the diminished operating characteristic of said associated one phase in response to the difference between the sensed electric current of said associated one phase and the current command signal of the one phase having a predetermined relationship relative to a reference error value.

15. An apparatus for controlling an electric motor having a plurality of motor phases, said apparatus comprising:
   means for controlling energization of each phase of the plurality of phases; and
   compensation means associated with each phase of the plurality of motor phases, said compensation means associated with one phase adjusting an electric parameter of another phase an amount functionally related to an electric characteristic of the one phase in response determining a diminished operating characteristic of the one phase.

16. An apparatus as set forth in claim 15 further including means for sensing electric current of the one phase, said compensation means including means for adjusting an electric current characteristic of the another phase in response to an electric operating characteristic of the one phase exceeding a preset level.

17. An apparatus as set forth in claim 16 wherein said apparatus further includes current control means for providing a command voltage signal for controlling energization of each phase of said plurality of motor phases, the electric operating characteristic of the one phase being the command voltage of the one phase, said compensation means determining the diminished operating characteristic of the one phase in response to the command voltage signal of the one phase exceeding an available voltage level.

18. An apparatus as set forth in claim 16 wherein said control means further includes motor control means associated with the one phase for providing a current command signal for controlling energization of the one phase, said compensation means of the one phase determining the diminished operating characteristic of the one phase based on the difference between the sensed electric current of the one phase and the current command signal of the one phase having a predetermined relationship relative to a reference error value.

19. A method for controlling operation of an electric motor having a plurality of motor phases, said method comprising the steps of:
   providing a current command signal for each of the plurality of motor phases;
   determining a diminished operating characteristic of one phase of the plurality of motor phases; and
   adjusting a control parameter of another phase of the plurality of motor phases an amount functionally related to an electric characteristic of the one phase of the plurality of motor phases based on said step of determining.

20. A method as set forth in claim 19 further including providing a command voltage signal for the one phase based on the current command signal for the one phase, the diminished operating characteristic for the one phase being determined in response to the command voltage signal of the one phase exceeding an available voltage level.

21. A method as set forth in claim 19 wherein said step of determining further includes determining the diminished operative characteristic of the one phase in response to the difference between the sensed electric current of the one phase and the current command signal of the one phase having a predetermined relationship relative to a reference error value.

* * * * *